United States Patent Office 3,360,461
Patented Dec. 26, 1967

3,360,461
LOW SOLIDS SALT WATER DRILLING FLUIDS
Duane B. Anderson and James L. Lummus, Tulsa, Okla., assignors to Pan American Petroleum Corporation, Tulsa, Okla., a corporation of Delaware
No Drawing. Filed Apr. 20, 1964, Ser. No. 361,270
4 Claims. (Cl. 252—8.5)

The present invention relates to improved drilling fluids. More particularly, it is concerned with stable low solids salt water drilling fluids having highly desirable fluid loss and hydraulic friction characteristics.

Although the marked advantages of low solids fresh water muds have been known now for some ten years, their counterpart in salt water systems has not been developed in spite of an obvious need therefor. Thus, where salt water drilling fluids have to be used, high viscosity-high gel attapulgite-starch muds introduced in the late 1930's are still employed. These attapulgite starch muds have all of the drawbacks of any high solids mud, such as low drilling rates, more bits per 1000 feet of hole, higher pumping costs, and excessive pump wear.

One factor responsible for the delay in developing a low solids salt water mud has been that bentonite is not ordinarily dispersible in salt water. Low solids salt water systems cannot be prepared using attapulgite clays because the latter have no fluid loss control characteristics whatever and are readily removed from the drilling fluid when conventional flocculants are added thereto.

Accordingly, it is an object of our invention to provide a low solids salt water drilling fluid in which bentonite and similar clays are readily dispersible by the use of suitable bentonite beneficiating agents. It is another object of our invention to employ flax meal as a fluid loss control agent in such drilling muds. It is a still further object of our invention to provide a low solids salt water drilling fluid wherein the fluid loss control agent is stable to drilled solids.

We have now discovered a highly efficient low solids salt water drilling fluid having all of the desirable qualities of low solids fresh water muds. Basically, the drilling fluids of our invention contain as the principal ingredients prehydrated bentonite and a clay beneficiating polymer or agent. Salt water muds having even better hydraulic friction and improved fluid loss characteristics can be prepared by adding flax meal to the prehydrated bentonite-polymer-mud system just mentioned. In preparing these fluids, the bentonite is prehydrated by adding the latter to fresh water containing the beneficiating agent. Usually, under these conditions, the concentration of bentonite should not exceed about 5 weight percent since greater amounts become too viscous to handle easily. After the bentonite has been added, agitation is continued, generally from four to six hours, and thereafter the resulting slurry is allowed to age for at least twenty-four hours. Slurries of prehydrated bentonite and polymer are prepared in essentially the same way be mixing 5 weight percent bentonite and, for example, about 0.075 lb. of polymer per barrel in the form of a 1 percent aqueous solution. The product thus obtained may then be added to salt water in varying amounts, usually from about 10 to about 50 percent by volume, to give a drilling fluid in which the properties of the bentonite are much the same as those observed in bentonite-containing fresh water muds. To improve fluid loss properties of these low solids salt water fluids, flax meal can be employed in concentrations of from about 1.5 to about 6 lbs. per barrel with excellent results. Sometimes it may be found desirable to add the bentonite slurry to the salt water system to which the bentonite-beneficiating polymer has already been added to assist in a more complete dispersion of the bentonite. The resulting mixture is then agitated for an additional four to six hours, after which it is aged for another twenty-four hours.

Alternatively, the low solids salt water muds of our invention may be prepared in the field as follows:

Bentonite in an amount sufficient to make a 5 weight percent (based on water) slurry is added with agitation to fresh water in an earthen pit. Simultaneously with or prior to the addition of bentonite, the polymer is added in a concentration of from abount 0.075 to about 3 lbs. per barrel. After the bentonite has been allowed to hydrate properly, it is ready for addition to the circulating mud system.

When drilling below surface casing in a salt section and before fluids loss control is needed, the prepared mixture of prehydrated bentonite and polymer can be added in amounts of from 5 to 15 bbls. (42 gallons per bbl.) to said system per tour, i.e., one eight-hour shift. The viscosity required determines the frequency and amount of the prehydrated mixture to be added. Also, the supply of beneficiating agent in the circulating mud should be supplemented at the rate of about 2 to 4 lbs. per tour. When fluid loss control is necessary, two methods may be used: (1) flax meal is added to the system in amounts of from about 3 to 6 lbs. per barrel to mud with about 0.1 lb. of preservative per barrel. This preservative may be any of several of known materials, such as, for example, paraformaldehyde and pentachlorophenol. Addition of prehydrated bentonite and polymer is continued as noted above; (2) the circulating mud viscosity is increased by additional amounts of prehydrated bentonite before addition of the flax meal and preservative. The conditions under which viscosity and fluid loss properties of the mud are maintained cannot be outlined accurately, but generally the addition of 5 to 15 bbls. per tour of prehydrated bentonite (5 weight percent slurry) and 100 to 150 lbs. per tour of flax meal while drilling, is in the required range for the majority of cases.

Periodical addition of polymer to the mud system is desirable because it aids in the removal or flocculation of native clays from said system. In doing so, however, a certain amount of polymer is, likewise, removed. The amount and frequency of addition depend largely on the drilling rate. Also, some bentonite is lost at the shale shaker, in jetting the mud pits, etc. and must be replaced. The amounts of bentonite and polymer to be added at any given time can be readily determined by measuring the properties of the drilling fluid.

The polymers—or more correctly, the copolymers—employed in carrying out our invention may be generally classified as clay flocculants, but differ from such broad class in that they do not tend to flocculate bentonite. On the contrary, they act as beneficiating agents for bentonite. Typical of such copolymers is the type described in Scott U.S. 3,070,543. This patent discloses water-soluble vinyl-acetate-maleic anhydride copolymers in drilling muds wherein such copolymers function as bentonite-beneficiating agents while flocculating other drilled solids. The method by which such copolymers are prepared is described in detail in Vaer U.S. 2,473,474. Usually sufficient calcium or similar base is added to convert approximately one half of the acid groups in the polymer to the corresponding water-soluble salt.

Another copolymer highly suitable for use in our invention is one prepared in accordance with the procedure described in Morgan U.S. 2,775,557. This material is a copolymer of acrylic acid and acrylamide in which sufficient base is added to neutralize the acid and produce a pH of about 7 in a reaction mixture to yield a water-soluble salt. To define this copolymer a bit further, it should be pointed out that the ratio of acrylate to amide groups may range from about 12:88 to about 70:30. Copolymerization of the acrylic acid and acrylamide is then conducted under conditions such that a 1 percent solution of the resulting product in distilled water has a viscosity of between about 2,000 and about 20,000 centipoises, as measured with a Brookfield viscosimeter at 20° C., rotating at 6 r.p.m., using a No. 2 spindle for viscosities up to 5,000, a No. 3 spindle between 5,000 and 20,000 centipoises, and a No. 4 spindle for viscosities in excess of 20,000 centipoises.

While the flax meal used in preparing the drilling fluids of our invention may be crude, unscreened material, we ordinarily prefer to employ the meal exclusive of hulls and particularly flax meal in a particle size range of from about −12 to +30 mesh. We have found that with the screened meal having the latter particle size range—in salt or sea water systems—the hydraulic friction may be as much as 15 percent less than with unscreened meal and about 30 percent less than systems containing flax meal having a particle size of from −60 to +100 mesh. While the savings in horsepower required to force such fluids through the drilling system are certainly noticeable, this savings becomes very substantial when the meal is used in the preferred particle size range noted above. The quantity of flax meal needed to produce a low solids mud of the type contemplated by our invention may vary rather widely. For fluid loss purposes, this amount may range from about 1.5 to about 6 lbs. per barrel of sea water and in the case of unscreened flax meal somewhat higher concentrations are generally desirable.

Various aspects of our invention are illustrated by the discussion and tables of data which follow. In determining the properties of low solids salt water muds, a fluid containing equal parts by volume of a saturated brine and a slurry of 5 weight percent prehydrated bentonite in fresh water was used. The vinyl acetate-maleic anhydride copolymer was added in the amount indicated to a slurry of 5 weight percent prehydrated bentonite in fresh water and this mixture then combined with the salt water.

The above data show that the viscosity stability of the final mud is improved by addition of the polymer. Initially the viscosities of salt water muds prepared with prehydrated bentonite and with prehydrated bentonite plus polymer are about the same. However, after these muds were slowly and continuously agitated in a rolling oven at 120° F. for eighteen hours—to duplicate drilling conditions—the one containing only prehydrated bentonite showed a marked decrease in yield value—from 17 to 6.5 lbs. per 100 square feet—whereas the mud containing both bentonite and the polymer decreased in yield value from 20.5 to 14.5 lbs. per 100 square feet. The plastic viscosity of the bentonite-polymer system increased from 3 to 6.5 c.p.s. after rolling, while no change in plastic viscosity was observed with the mud containing only bentonite.

The acrylate-acrylamide polymer referred to above, when substituted for the vinyl acetate, maleic anhydride copolymer, gave somewhat better fluid loss results. In general, we have found that this polymer is more effective than the one prepared from vinyl acetate and maleic anhydride when used in combination with the various mud systems described herein.

Although gums such as guar and starch initially impart better fluid loss properties to low solids salt water muds than flax meal, we have found that starch and guar are not nearly as stable in such mud systems as flax meal. Apparently this stems from the fact that guar and starch are ordinarily better flocculants than flax meal. Hence, in the presence of drilled solids starch and guar tended to come out of solution much more readily. This is shown by the series of tests in which a saturated salt water mud having the following composition was employed and to some portions of which guar, flax meal, or starch had been added: ¾ barrel saturated salt water, ¼ barrel 5 weight percent prehydrated bentonite, 0.075 lb. per barrel vinyl acetate-maleic anhydride copolymer.

TABLE I.—EFFECT OF POLYMER ON VISCOSITY OF SALT MUDS PREPARED USING PREHYDRATED BENTONITE

| Additives to Prehydrated Bentonite Mud | Plastic Viscosity, cps. | Yield Value, lbs./ 100 sq. ft. | Fann Gels, lbs./ 100 sq. ft. | | Fluid Loss, cc./ 30 min. |
|---|---|---|---|---|---|
| | | | 10 sec. | 10 min. | |
| None | 3 | 17 | 12 | 14 | 110 |
| None* | 3 | 6.5 | 5 | 7 | 137 |
| .075 lb./bbl. Polymer | 3 | 20.5 | 12 | 14 | 108 |
| .075 lb./bbl.* Polymer | 6.5 | 14.5 | 7 | 7 | 120 |

*Mud sample rolled in oven at 120° F. for 18 hours.

TABLE II.—FLUID LOSS CONTROL AGENTS FOR PREHYDRATED BENTONITE-POLYMER SALT MUD

| Additive | Amount, lbs./bbl. | Plastic Viscosity, cps. | Yield Value, lbs./ 100 sq. ft. | Fann Gels, lbs./100 sq. ft. | | Fluid Loss, cc./ 30 min. |
|---|---|---|---|---|---|---|
| | | | | 10 sec. | 10 min. | |
| None | | 4 | 7 | 5 | 5 | 175 |
| Do.[1] | | 4.5 | 4 | 3 | 4 | 214 |
| Flax meal [1] | 3 | 5 | 3 | 3 | 5 | 52 |
| Do.[2] | 3 | 6 | 4 | 4 | 6 | 55.4 |
| Do.[1] | 6 | 6 | 6 | 3 | 4 | 33 |
| Do | 6 | 5 | 8 | 4 | 5 | 45 |
| Do.[1] | 8 | 7 | 7 | 3 | 4 | 28 |
| Do | 8 | 8 | 8 | 4 | 5 | 33.5 |
| Do.[1] | 12 | 10 | 7 | 3 | 4 | 16 |
| Do | 12 | 10 | 10 | 5 | 7 | 19 |
| Starch | 2 | 2.5 | 1 | 0 | 0 | 48 |
| Do.[1] | 2 | 3.5 | 2 | 2 | 4 | 69.5 |
| Do.[1] | 4 | 5 | 1 | 0 | 0 | 12.4 |
| Do | 4 | 4.5 | 4 | 1 | 3 | 8.2 |
| Do.[1] | 6 | 6 | 3 | 0 | 1 | 4.2 |
| Do | 6 | 7 | 3 | 1 | 2 | 3.8 |
| Do.[1] | 8 | 7 | 4 | 0 | 1 | 3.3 |
| Do | 8 | 8 | 5 | 1 | 2 | 2.4 |
| Guar gum | 0.5 | 5 | 2 | 1 | 3 | 66.5 |
| Do.[1] | 0.5 | 5 | 1 | 1 | 2 | 163.0 |
| Do.[1] | 1.0 | 5 | 1.5 | 0 | 1 | 55.0 |
| Do | 1.0 | 8 | 5 | 1 | 2 | 20.0 |
| Do.[1] | 1.5 | 6 | 3 | 0 | 1 | 30.0 |
| Do | 1.5 | 11 | 7 | 2 | 3 | 14.5 |
| Do.[1] | 2.0 | 11 | 2 | 0 | 1 | 10.5 |
| Do | 2.0 | 16 | 18 | 3 | 4 | 8.4 |

[1] Rolled 18 hours at 120° F.
[2] Flax meal used in this work had a particle size range of from −12 to +30 mesh.

From the above data it will be seen that the fluid loss of muds containing either starch or guar gum increased considerably after rolling, whereas the one to which flax meal was added was much more stable in this respect.

In Table III, below, tests were run on a base mud of the following compositions: ¾ barrel saturated salt water, ¼ barrel 5 weight percent bentonite, and 0.075 lb. per barrel of vinyl acetate-maleic anhydride copolymer, to determine the behavior of such drilling fluid over long intervals. To this base mud—with the exception of the blank—were added varying amounts of starch, guar or flax meal. The results given were all obtained after the mud sample was rolled at 120° F. for eighteen hours.

TABLE III.—EFFECT OF LOW YIELD SOLIDS ON PROPERTIES OF PREHYDRATED BENTONITE-POLYMER SALT MUDS

| Additive | Amount, lbs./bbl. | Plastic Viscosity, cps. | Yield Value, lbs./100 sq. ft. | Fann Gels, lbs./100 sq. ft. 10 sec. | Fann Gels, lbs./100 sq. ft. 10 min. | Fluid Loss, cc./30 min. |
|---|---|---|---|---|---|---|
| None | | 4 | 3 | 5 | 6 | 209 |
| Low Yield Clay | 50 | 4 | 4 | 5 | 7 | 132 |
| Flax meal | 3 | 7 | 6 | 6 | 9 | 58.5 |
| Do | 3 | | | | | |
| Low Yield Clay | 50 | 8 | 9 | 5 | 8 | 54.4 |
| Starch | 2 | 5 | 1.5 | 1 | 2 | 46 |
| Do | 2 | | | | | |
| Low Yield Clay | 50 | 9.5 | 10.5 | 12 | 16 | 120 |
| Guar Gum | 0.5 | 5 | 0.5 | 0 | 1 | 55 |
| Do | 0.5 | | | | | |
| Low Yield Clay | 50 | 7 | 14.5 | 8 | 9 | 127 |

The results in the above-mentioned table indicate that a prehydrated bentonite-polymer salt water system treated with flax meal is more stable than systems employing starch or guar gum to contamination by drilled solids over long drilling intervals. It is also apparent that less flax meal than starch or guar gum is needed to maintain proper fluid loss characteristics of the mud.

The applicability of one of the low solids muds of our invention to field use is illustrated in the following example:

Example

In western Oklahoma a prehydrated bentonite-vinyl acetate-maleic anhydride polymer-flax meal salt mud was used on a Blaine County well, designated Well A. This mud contained 0.075 lb. per barrel of polymer, 25 percent by volume of prehydrated bentonite in the form of a 5 weight percent fresh-water slurry, and 75 percent by volume of saturated salt water. In a second well (B), which was a direct offset, a conventional attapulgite-starch salt mud was employed. The properties of the muds used in drilling Wells A and B are shown in Tables IV and V, respectively, below.

In comparing the mud properties of the two wells, it is noted that the funnel viscosities are approximately the same while the gel strengths of the offset well were higher than those of Well A. The fluid losses in Well A below 7,000 feet range from 54 cc. down to 24 cc./30 minutes and in Well B the range was from 28 cc. down to 8 cc./30 minutes. In this area it is general practice to maintain the fluid loss between 10 and 15 cc. for 30 minutes to insure good hole conditions. However, hole conditions were completely satisfactory using the higher fluid loss low solids salt water mud in Well A. Logs were run without difficulty and without resorting to the standard practice of raising the viscosity of the mud prior to logging. In Well A the number of feet drilled per bit was increased by 40 percent and the bit life increased by 23 percent. Also, the penetration rate was 22 percent higher in the case of Well A as compared to offset Well B.

Additional advantage was obtained from the use of flax meal in the low solids salt mud in that pressure losses in the mud circulating system were substantially reduced. Following the addition of flax meal, the pump pressure

TABLE IV.—DRILLING FLUID PROPERTIES ON WELL A

| Depth Feet | Weight, lbs./gal. | Funnel Viscosity, sec./qt. | Plastic Viscosity, cps. | Yield Value, lbs./100 sq. ft. | Fann Gels, lbs./100 sq. ft. 10 sec. | Fann Gels, lbs./100 sq. ft. 10 min. | Fluid Loss, cc./30 min. | Chloride ion Content, p.p.m. | Solids Content, vol. percent | Oil Content, vol. percent |
|---|---|---|---|---|---|---|---|---|---|---|
| 6,152 | 9.5 | 33 | 6 | 1 | 2 | 3 | 78 | 30,000 | 8 | 2 |
| 6,410 | 9.7 | 36 | 8 | 2 | 3 | 5 | 76 | 33,000 | 9 | 2 |
| 6,660 | 9.5 | 34 | 8 | 2 | 2 | 4 | 70 | 30,000 | 8 | 3 |
| 6,864 | 9.6 | 35 | 8 | 2 | 4 | 5 | 54 | 32,000 | 8 | 2.5 |
| 7,220 | 9.6 | 45 | 13 | 5 | 3 | 8 | 34 | 35,000 | 8 | 4 |
| 7,507 | 9.7 | 44 | 12 | 0 | 0 | 4 | 27 | 39,000 | 8 | 4 |
| 7,744 | 9.7 | 37 | 11 | 3 | 1 | 5 | 36 | 39,000 | 8 | 3 |
| 7,919 | 9.7 | 38 | 9 | 2 | 1 | 4 | 27 | 37,000 | 8 | 3 |
| 8,137 | 9.6 | 34 | 8 | 2 | 0 | 3 | 24 | 37,000 | 8 | 4 |
| 8,276 | 9.6 | 35 | 9 | 2 | 0 | 3 | 29 | 38,000 | 7 | 4 |

TABLE V.—DRILLING FLUID PROPERTIES ON WELL B

| Depth Feet | Weight, lbs./gal. | Funnel Viscosity, sec./qt. | Fann Gels, lbs./100 sq. ft. 10 sec. | Fann Gels, lbs./100 sq. ft. 10 min. | Fluid Loss, cc./30 min. | Chloride ion Content, p.p.m. | Solids Content, vol. percent | Oil Content, vol. percent |
|---|---|---|---|---|---|---|---|---|
| 5,624 | 10.0 | 35 | 6 | 9 | 56.4 | 29,000 | 12 | 4 |
| 6,211 | 10.0 | 35 | 8 | 9 | 70.4 | 29,000 | 11 | 3 |
| 6,650 | 9.8 | 37 | 11 | 13 | 24.8 | 26,500 | 10 | 6 |
| 6,894 | 9.6 | 37 | 10 | 13 | 19.4 | 25,000 | 10 | 4 |
| 7,017 | 9.5 | 36 | 9 | 12 | 28 | 26,000 | 10 | 4 |
| 7,343 | 9.5 | 41 | 11 | 16 | 15 | 27,000 | 12 | 4 |
| 7,770 | 9.7 | 48 | 12 | 16 | 8.8 | 23,000 | 13 | 3 |
| 8,019 | 9.7 | 41 | 11 | 13 | 8.0 | 27,500 | 12 | 3.5 |
| 8,294 | 9.7 | 40 | 7 | 10 | 12 | 19,500 | 11 | 2 |
| 8,610 | 9.9 | 52 | 12 | 14 | 11.4 | 20,000 | 12 | 1 | decreased from 1240 p.s.i. to 1125 p.s.i., or 9 percent, with the same flow rate of 380 g.p.m. The horsepower required to overcome the friction in the drill pipe was reduced from 228, corrected for depth, to 191 or 16 percent. Because of the experimental nature of the prehydrated bentonite-polymer-flax meal salt mud, total mud cost was approximately $12,000 to a depth of 8,500 feet on Well A, as compared to about $7,000 for offset Well B at the same depth. However, because of the improved mud flow properties and lower solids of the salt mud containing flax meal, approximately six rig days and eight bits were saved, as compared to offset Well B. This amounted to a savings of approximately $7,560. Taking into account an increase of average mud costs of $5,000, this made a net savings on Well A of about $2,560.

By the present invention we have provided a class of drilling fluids having all the advantages of low solids, fresh-water muds together with the added desirable property of low fluid loss and decreased hydraulic friction. Our invention is concerned primarily with providing a means by which bentonite can be used in stable low solids salt water mud systems and basically concerns low solids salt water muds wherein the prehydrated bentonite tends to behave much in the same manner as it does in fresh-water systems by the use of bentonite beneficiating agents capable of flocculating clays other than bentonite. Our invention further contemplates improving the properties of such muds through the use of flax meal which has been shown to be a much more desirable fluid loss agent in salt water muds than gums such as starch and guar.

As used in the present description and claims, the expression "low solids salt water muds" is intended to refer to such drilling fluids containing not more than about 5 weight percent clay solids and preferably not more than about 3 weight percent of such solids. The term "selective water-soluble beneficiating agent" as used in the claims is intended to mean agents which will flocculate clays in the presence of bentonite without so affecting the latter.

We claim:
1. A low solids salt water drilling fluid containing a small but effective amount of a prehydrated montmorillonitic clay not to exceed about 17 lbs. per barrel of said fluid, a selective water soluble beneficiating agent for said clay present in a concentration of from about 0.075 to about 3 lbs. per barrel of said fluid, said beneficiating agent being selected from the class consisting of a vinyl-maleic copolymer having from 1 to about 1½ times as many vinyl radicals as maleic radicals and a water soluble salt of an acrylic acid-acrylamide copolymer, wherein the ratio of carboxylic acid salt groups to amide groups ranges from about 12:88 to about 70:30, said copolymer being polymerized to a degree such that a 1 percent by weight solution in distilled water has a viscosity of between about 2,000 and about 20,000 cps., as measured with a Brookfield viscosimeter at 20° C., rotating at 6 r.p.m., using a No. 2 spindle for viscosities up to 5,000, a No. 3 spindle between 5,000 and 20,000, and a No. 4 spindle for viscosities above 20,000 cps., and from about 1.5 to about 6 lbs. per barrel of flax meal, exclusive of hulls, having an average particle size ranging from about −12 to about +30 mesh.

2. The drilling fluid of claim 1 wherein the clay is prehydrated bentonite.

3. The drilling fluid of claim 2 wherein the clay beneficiating agent is a vinyl-maleic copolymer having from about 1 to about 1½ times as many vinyl radicals as maleic radicals.

4. The drilling fluid of claim 3 wherein said copolymer is prepared from vinyl acetate and maleic anhydride.

References Cited
UNITED STATES PATENTS

| | | | |
|---|---|---|---|
| 2,209,591 | 7/1940 | Barnes | 252—8.5 |
| 2,593,528 | 4/1952 | Bolley et al. | 260—209 |
| 2,734,860 | 2/1956 | Larsen et al. | 252—8.5 |
| 2,775,557 | 12/1956 | Morgan | 252—8.5 |
| 2,854,407 | 9/1958 | Mallory | 252—8.5 |
| 3,070,543 | 12/1962 | Scott | 252—8.5 |
| 3,070,544 | 12/1962 | Johnson | 252—8.5 |
| 3,081,260 | 3/1963 | Park | 252—8.5 |

LEON D. ROSDOL, *Primary Examiner.*

H. B. GUYNN, *Assistant Examiner.*